(12) United States Patent
Mysen et al.

(10) Patent No.: US 9,336,530 B2
(45) Date of Patent: May 10, 2016

(54) MIXING FIRST AND SECOND PRICE BIDS IN AN AUCTION

(75) Inventors: Clarence C. Mysen, San Francisco, CA (US); Gregory J. Friedman, Mountain View, CA (US); Jennifer Liu Low, Cupertino, CA (US); David A. Sloan, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 477 days.

(21) Appl. No.: 13/114,267

(22) Filed: May 24, 2011

(65) Prior Publication Data

US 2012/0303462 A1  Nov. 29, 2012

(51) Int. Cl.
 *G06Q 30/02* (2012.01)
 *G06Q 30/08* (2012.01)

(52) U.S. Cl.
 CPC .............. *G06Q 30/02* (2013.01); *G06Q 30/08* (2013.01)

(58) Field of Classification Search
 CPC ............................. G06Q 30/02; G06Q 30/08
 See application file for complete search history.

(56) References Cited

U.S. PATENT DOCUMENTS

| | | | |
|---|---|---|---|
| 7,058,602 B1 * | 6/2006 | La Mura | G06Q 40/04 705/37 |
| 2003/0163410 A1 | 8/2003 | Byde et al. | |
| 2003/0216959 A1 * | 11/2003 | Vitti | G06Q 30/02 705/14.39 |
| 2005/0273416 A1 | 12/2005 | Tanzer | |
| 2006/0271438 A1 | 11/2006 | Shotland et al. | |
| 2007/0299682 A1 * | 12/2007 | Roth | G06Q 30/02 705/1.1 |
| 2011/0071947 A1 | 3/2011 | Muthukrishnan et al. | |

* cited by examiner

*Primary Examiner* — John Van Bramer
(74) *Attorney, Agent, or Firm* — Foley & Lardner LLP; John D. Lanza; James De Vellis (57) ABSTRACT

In one aspect, methods include receiving one or more first bids that have associated fixed prices, receiving one or more second bids that have dynamic prices that are adjusted at a time of auction in consideration of other bids in the auction, conducting an auction including pricing the one or more first bids and the one or more second bids, the one or more first bids being priced at their respective fixed prices and the one or more second bids being priced at respective amounts that maintain each second bid in a position marginally above a next-highest bid in the auction, and serving content based on one or more winning bids from the auction.

20 Claims, 4 Drawing Sheets

FIG. 4

MIXING FIRST AND SECOND PRICE BIDS IN AN AUCTION

TECHNICAL FIELD

This specification relates to information presentation.

BACKGROUND

Interactive media (e.g., the Internet) has great potential for improving the targeting of content (e.g., advertisements or "ads") to receptive audiences. For example, some websites provide information search functionality that is based on keywords entered by the user seeking information. A user query can be an indicator of the type of information of interest to the user. By comparing the user query to a list of keywords specified by a content provider, it is possible to provide relevant content to the user.

Another form of online advertising is ad syndication, which allows advertisers to extend their marketing reach by distributing ads to additional partners. For example, third party online publishers can place an advertiser's text or image ads on web properties and mobile applications with desirable content to drive online customers to the advertiser's website.

SUMMARY

In general, in one aspect of the subject matter described in this specification may be embodied in methods for The methods include receiving one or more first bids that have associated fixed prices, receiving one or more second bids that have dynamic prices that are adjusted at a time of auction in consideration of other bids in the auction, conducting an auction including pricing the one or more first bids and the one or more second bids, the one or more first bids being priced at their respective fixed prices and the one or more second bids being priced at respective amounts that maintain each second bid in a position marginally above a next-highest bid in the auction, and serving content based on one or more winning bids from the auction.

In another aspect, the methods include receiving one or more first bids that have associated fixed prices, receiving one or more second bids that have dynamic prices that are adjusted at a time of auction in consideration of other bids in the auction, conducting an auction including pricing the one or more first bids and the one or more second bids, the one or more first bids being priced at their respective fixed prices and the one or more second bids being priced at respective amounts that maintain each second bid in a position marginally above a next-highest bid in the auction, determining that one of the one or more first bids is a winning bid for the auction, determining a correction factor that represents a difference between a fixed price associated with the winning first bid and a second price for the winning first bid, storing the correction factor, and serving content based on one or more winning bids from the auction.

Aspects can include one or more of the following features.

The one or more first bids include one or more of cost-per-click (CPC) bids and cost-per-thousand impressions (CPM) bids.

The one or more second bids include one or more of cost-per-click (CPC) bids and cost-per-thousand impressions (CPM) bids.

The one or more second bids include one or more of maximum cost-per-click (CPC) bids, maximum cost-per-thousand impressions bids, cost-per-acquisition bids, and cost-per-purchase bids.

The auction includes a second price auction.

The one or more second bids are priced in accordance with rules associated with the second price auction.

The content includes one or more advertisements.

A future bid of a first bidder associated with the winning first bid is adjusted based at least in part on the correction factor.

Correction factors are accumulated per bidder and one or more accumulated correction factors are applied to a future bid of a first bidder associated with the winning first bid so as to allow the future bid to be a winning bid.

Adjusting a future bid includes increasing the bid to a higher amount without charging the first bidder the higher amount.

Adjusting a future bid includes reducing an amount charged to the first bidder for a winning future bid based on the correction factor.

Adjusting the future bid includes decrementing the correction factor from an accumulation account associated with the first bidder The content includes one or more advertisements.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Methods, systems, and apparatus including computer program products are described that relate to the distribution of information. Content providers (e.g., advertisers) may provide one or more bids in an auction whose price is fixed at a time of bid (e.g., "first price" bids that are based on a fixed price, and whose price does not depend on the price of other bids in the auction). On the other hand, some content providers may provide one or more bids in an auction whose price depends on other bids in the auction (e.g., "second price" bids, whose price depends on one or more lower ranked bids in the auction). Techniques are described for pricing both types of bids and for carrying out an auction that includes both types of bids to effect efficient delivery of content through a content delivery system.

Figure 1:
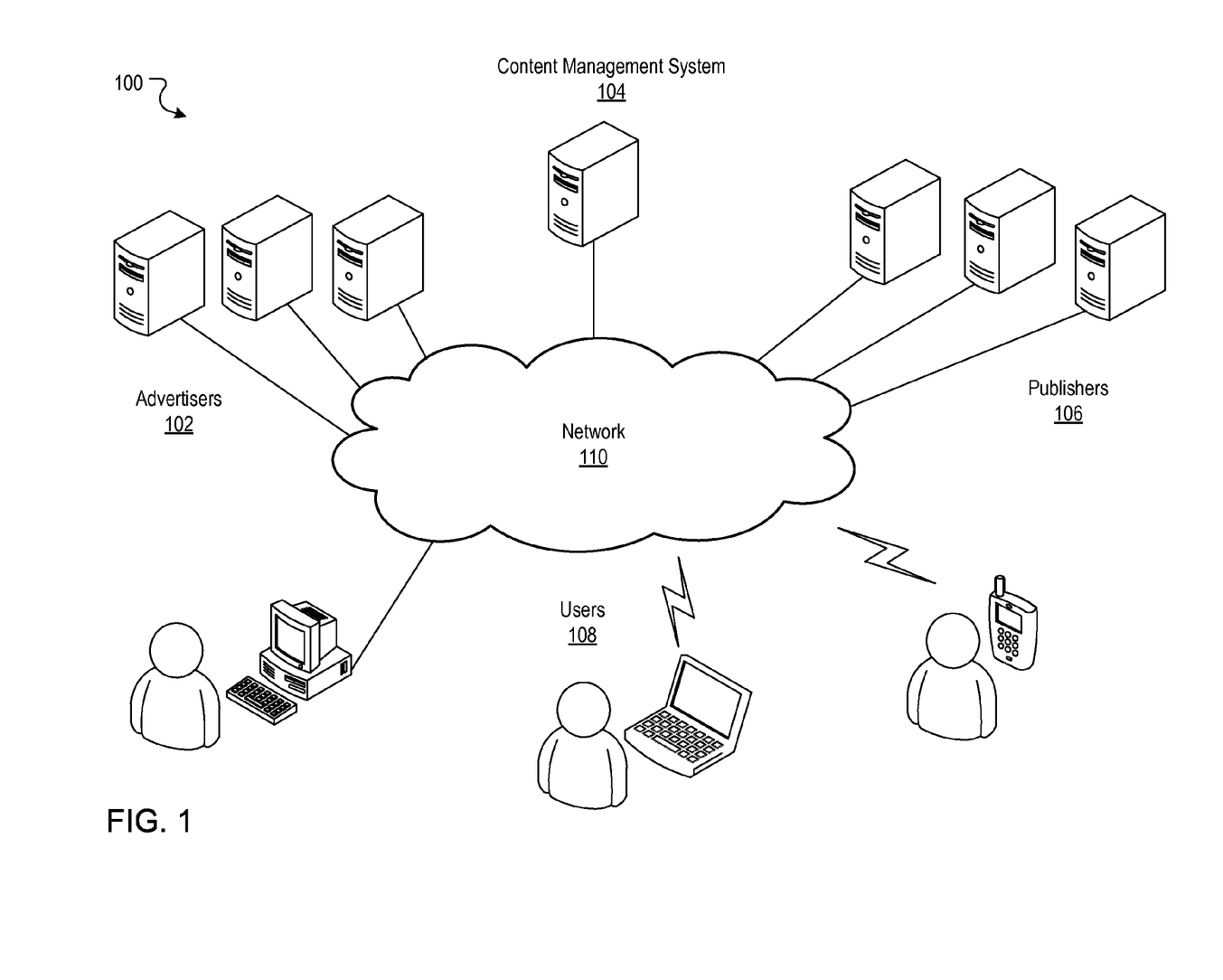
FIG. 1 is a diagram of an example system for providing a mixed auction.

FIG. 1 is a block diagram of an example online content delivery system 100. In some implementations, one or more content providers (e.g., advertisers) 102 can directly, or indirectly, enter, and maintain content (e.g., advertisement) information in a content management system 104. Though reference is made in numerous places in this document to advertising, other forms of content, including other forms of sponsored content, can be delivered by the system 100. The content may be in the form of graphical ads, such as banner ads, text only ads, image ads, audio ads, video ads, ads combining one of more of any of such components, etc. The content may also include embedded information, such as links, meta-information, and/or machine executable instructions. One or more publishers 106 and/or one or more user devices may submit requests for content to the content management system 104. The system 104 responds by sending content to the requesting publisher 106 (or directly to an end user) for placement on one or more of the publisher's web properties (e.g., websites and other network-distributed content). The content can include embedded links to landing pages, e.g., pages on the advertisers 102 websites, that a user is directed to when the user clicks an content item presented on a publisher website.

Other entities, such as users 108 and the content providers 102, can provide usage information to the system 104, such as, for example, whether or not a conversion or click-through related to a content item has occurred. This usage information can include measured or observed user behavior related to content that has been served. The system 104 performs financial transactions, such as crediting the publishers 106 and charging the content providers 102 based on the usage information.

A computer network 110, such as a local area network (LAN), wide area network (WAN), the Internet, or a combination thereof, connects the content providers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server (or a user that is accessing the content source by way of a redirect) may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). Alternatively, the content can be combined at a user's device (e.g., by combining in a user's browser content from the content source with ads provided by the system 104). The content server can transmit information about the ads back to the ad server, including information describing how, when, and/or where the ads are to be rendered (e.g., in HTML or JavaScript™).

An additional example of a publisher is a mobile application for providing content to a user, e.g., news, games, and other information. Content items (e.g., ads) can be presented along with application content. Providing content items for display within the mobile application includes determining a pricing model for the mobile application.

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores.

The search service can combine the search results with one or more of the ads provided by the system 104. This combined information can then be forwarded to the user 108 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the content management system 104 can serve publishers 106, such as content servers and search services. The system 104 permits serving of content targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In some examples, the content management system 104 may include an auction process to select content. Content providers (e.g., advertisers) may be permitted to select, or bid, an amount the providers are willing to pay, for example, for interaction with a provided content item (e.g., for each click of an advertisement as a cost-per-click amount an advertiser pays when, for example, a user clicks on an advertisement). The cost-per-click can include a maximum cost-per-click, e.g., the maximum amount the advertiser is willing to pay for each click of advertisement based on targeting criteria (e.g., one or more keywords). For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined, in some implementations, by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The score which determines the rank of advertiser A, B, and C can be determined as follows:

$A$:Rank=quality score×maximum cost-per-click=3.0× $0.50=1.50

$B$:Rank=quality score×maximum cost-per-click=1.0× $0.75=0.75

$C$:Rank=quality score×maximum cost-per-click=1.0× $1.00=1.00

The advertisers can be ranked as follows:
1. A
2. C
3. B

Content items can also be priced and ordered according to a second price auction. In addition to the cost-per-click and the quality score, a second price auction may adjust the price of bid by considering the amount selected or bid by the advertiser directly ranked below a given bid. For example, the "second price" (sometimes referred to as an "actual cost per click") of an advertisement can be the price that is necessary to keep a bid position above the next highest bid in the rank ordering. For example, in a second price auction the system 104 can determine how much the provider in position 1 would have to pay to give them a rank equal to the provider in position 2, and then the system 104 adds a unit amount, e.g., $0.01, to this determined amount.

To determine how much the provider in position 1 would have to pay to give them a rank equal to the provider in position 2, the rank of the bid in position 2 can be divided by the quality score of position 1. Thereafter, the system can add the nominal amount to determine the bid amount. The last provider in the list can be attributed a minimum score (e.g., a minimum rank, as shown above) or a minimum bid amount. Using this approach, the last provider can be second priced against the minimum score or minimum bid amount. In some examples, the last provider can be associated with both a minimum cost-per-click as well as a minimum score, and the maximum of the two parameters can be used to determine the last provider's bid amount. The second price of advertisers A, B, and C can be determined as follows:

$A$:$C$'s rank/$A$'s quality score=⅓=$0.33+$0.01=$0.34

$C$:$B$'s rank/$C$'s quality score=0.75/1=$0.75+ $0.01=$0.76

$B$:minimum cost-per-click=$0.20

In this example, A would only have to pay $0.34 to hold the first position in the list of providers. C would have to pay $0.76 to hold the second position. Provider B would be required to pay the minimum cost-per-click amount of $0.20.

Another metric for ranking and valuing advertisements is effective cost-per-thousand impressions (eCPM). The eCPM value represents the estimated earnings for every 1000 "impressions" an advertiser receives. An impression refers to the number of times a web page or pages containing a particular advertisement are shown to page visitors.

When the cost-per-click is known, such as in the auction scheme described above, eCPM can be calculated according to the following formula:

$eCPM=1000\times CPC\times$(Probability of Click)

The probability of click factor can be supplied based on historical data associated with an advertisement, a merchant, industry-wide data, or other factors. Thus, when an advertiser provides a cost-per-click bid, the eCPM formula can represent an advertiser's estimated earnings for every 1000 impressions received. Second price auctions such as those described above can also use eCPM values to create a second price value for an advertisement.

In some implementations, instead of bidding for a slot on a cost-per-click basis, a provider might prefer to place bids based on other factors. For example, an advertiser may wish to bid using a revenue sharing bid. In some examples, a revenue sharing bid is a bid based on a fraction of the sales which are attributable to a given advertisement, and may be sales associated with a single product, related products, categories of products, or plural categories, or alternatively may be related to sales at a location, in a given time, or in accordance with other agreed upon sharing of revenue. Other forms of revenue sharing are possible as agreed to between the advertiser and the advertising management system.

In some implementations, an auction may include both one or more bids that will be priced using the second price approach (sometimes referred to as "second price bids"), as well as one or more bids that will be priced using only the first price approach (sometimes referred to as "first price bids"). For example, in a given auction, there may be an advertiser that does not wish to have its bid price calculated using the second price approach, and instead wants its bids to have a "fixed" price (e.g., a fixed cost-per-click that is not adjusted based on the bid of the next-highest advertiser). In determining winning bids for such an auction, a mechanism is needed for considering both bids that will be subject to the second price approach, and bids that will be priced according to the first price approach.

Figure 2:
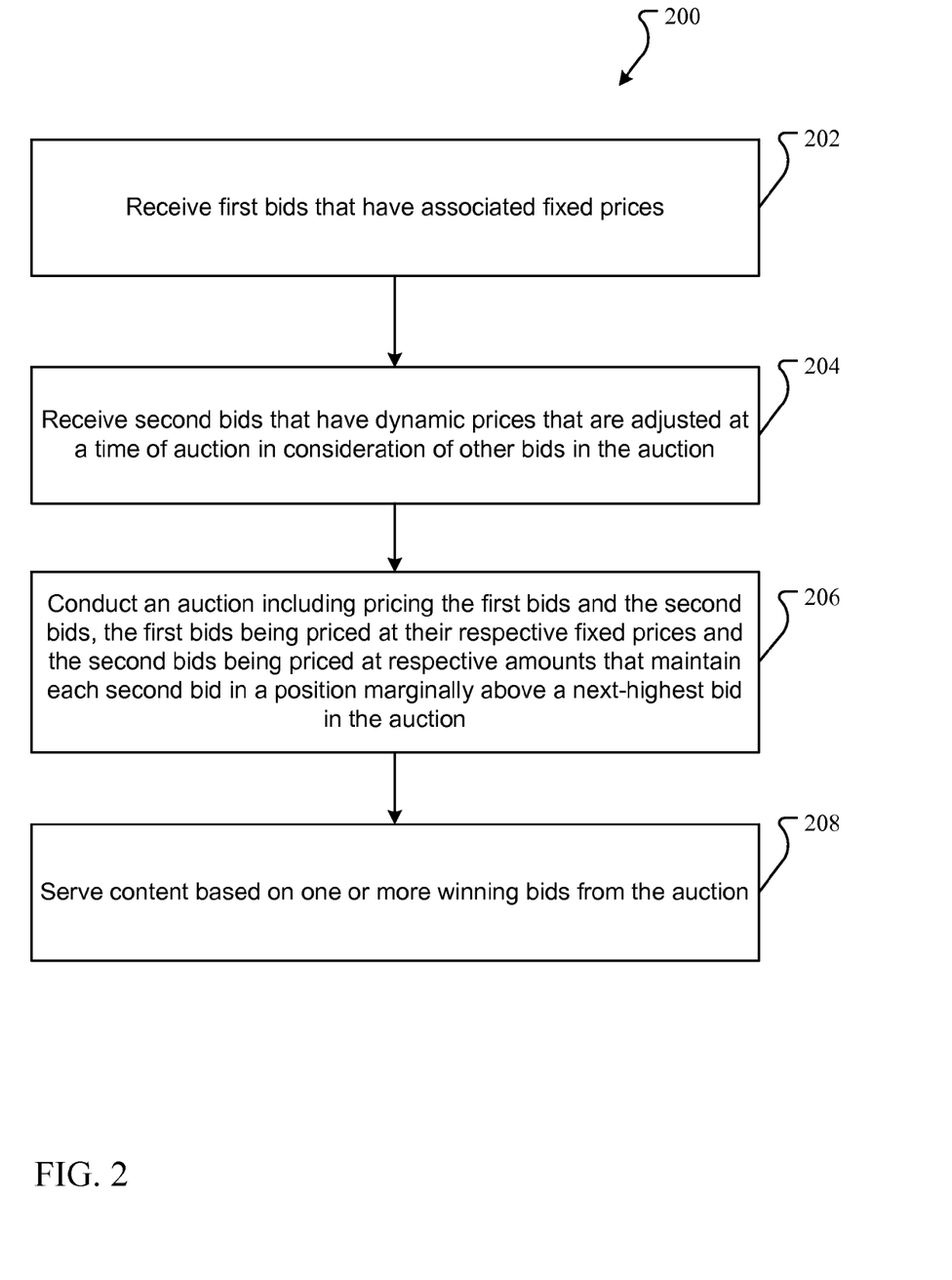
FIG. 2 is a flow chart of an exemplary process for providing a mixed auction.

FIG. 2 is a flow diagram of an example process 200 for conducting an auction that includes both first price bids and second price bids in an auction. First bids are received that have associated fixed prices (202). For example, the content management system 104 may receive first price bids from a provider 102 that include a fixed price. In some examples, the fixed price may include a fixed cost-per-click that the advertiser is willing to pay regardless of the price of any bids that rank below the first price bids in the auction.

Second bids are received that have dynamic prices that are adjusted at a time of auction in consideration of other bids in the auction (204). For example, the content management system 104 may receive second price bids whose prices are adjusted at a time of auction based on prices of other bids in the auction (e.g., a bid ranked directly below the second price bid in question).

An auction is conducted including pricing the first bids and the second bids, where the first bids are priced at their respective fixed prices and the second bids are priced at respective amounts that maintain each second bid in a position marginally above a next-highest bid in the auction (206). For example, the content management system 104 conducts an auction where the first price bids are priced according to the fixed prices specified by their corresponding providers, and the second price bids are priced based on the prices of other bids (including one or both of first price bids and second price bids) in the auction. An exemplary auction includes bids A, B, and C, where bid C is a first price bid, and bids A and B are second price bids. The content management system 104 can conduct an auction that includes bids A, B, and C as follows. As described above, the content management system 104 ranks the bids according to the following calculations.

$A$:Rank=quality score×maximum cost-per-click=3.0× $0.50=1.50

$B$:Rank=quality score×maximum cost-per-click=1.0× $0.75=0.75

$C$:Rank=quality score×true cost-per-click=1.0× $1.00=1.00

The advertisers can be ranked as follows:
1. A
2. C
3. B

To determine how much advertiser A (a second price bid) in position 1 would have to pay to give them a rank equal to advertiser C (a first price bid) in position 2, the quality score of the bid in position 2 can be divided by the quality score of position 1 and $0.01 can be added to that amount. Using this technique, the content management system 104 can price the bids as follows:

$A$:$C$'s rank/$A$'s quality score=⅓=$0.33+$0.01=$0.34

$C$:quality score×true cost-per-click=1.0×$1.00=$1.00

$B$:minimum cost-per-click=(e.g., $0.20)

Accordingly, the provider associated with second price bid A would pay $0.34, even though the first price bid below bid A (bid C) is priced at $1.00. This technique allows the advertiser associated with bid C to pay a fixed cost while maintaining the integrity of the second price auction process for other bids (e.g., second price bids A and B).

Content is identified/served based on one or more winning bids from the auction (208). Using the previous example, the content management system 104 could determine that bid A is the winning bid and could then serve content that is associated with bid A. Serving content associated with the winning bid can include serving (e.g., presenting on a web page in an advertisement slot) one or more advertisements that are associated with the winning bid.

Figure 3:
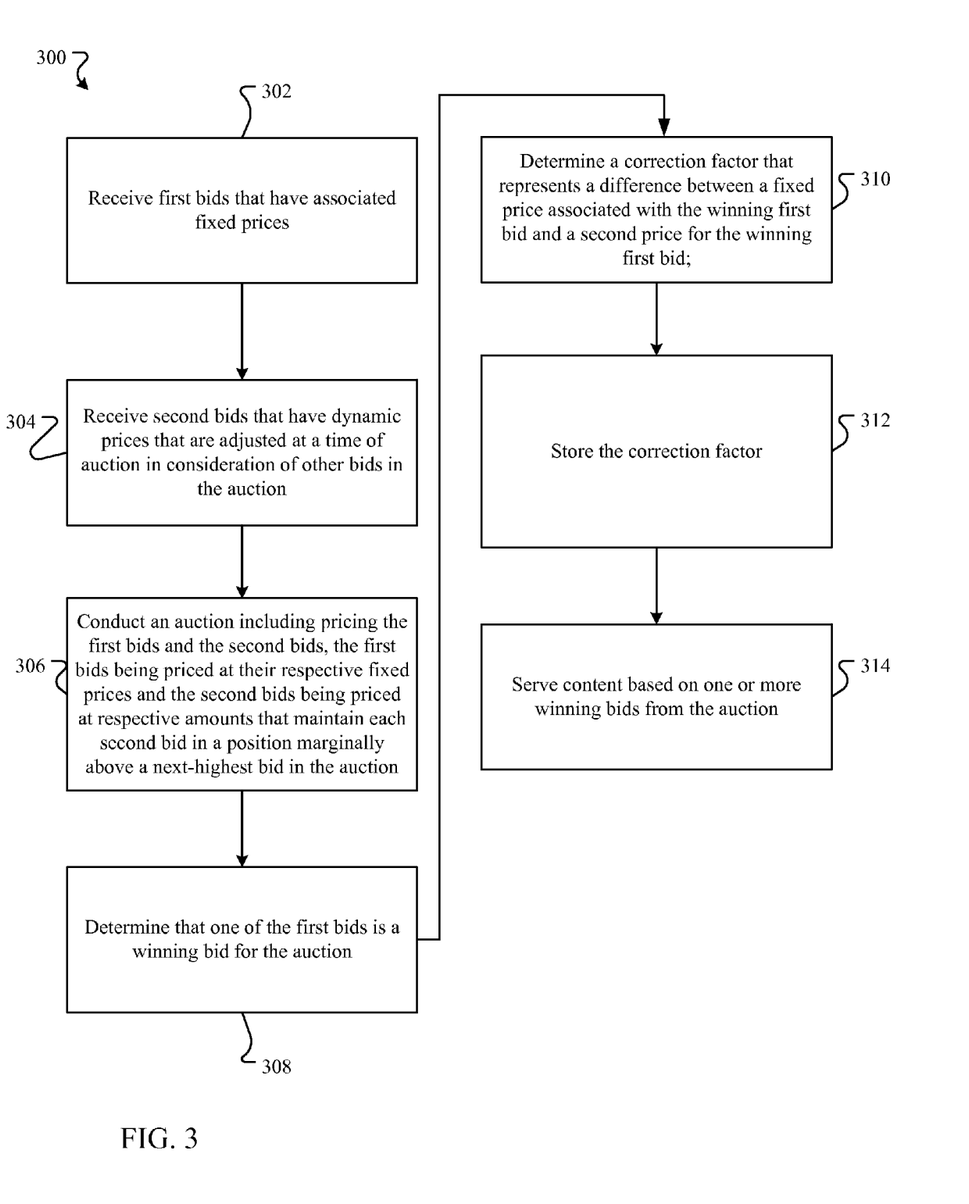
FIG. 3 is a flow chart of an exemplary process for providing a mixed auction.

These techniques allow both first and second price bidders to participate in the same auction. However, due to the dynamics of this auction process, first price bidders can be incentivized to reduce their bids (since they pay what they bid regardless of the other bids in the auction), which in turn can drop the value of the next bidder above them (and can drop the value of the auction as a whole). FIG. 3 represents an example process 300 for countering this type of behavior.

Referring to FIG. 3, first bids are received that have associated fixed prices (302). For example, the content management system 104 may receive first price bids from a provider 102 that include a fixed price. In some implementations, the fixed price may include a fixed cost-per-click that the advertiser is willing to pay regardless of the price of any bids that rank below the first price bids in the auction.

Second bids are received that have dynamic prices that are adjusted at a time of auction in consideration of other bids in the auction (304). For example, the content management system 104 may receive second price bids whose prices are adjusted at a time of auction based on prices of other bids in the auction (e.g., a bid ranked directly below the second price bid in question).

As described above, an auction is conducted including pricing the first bids and the second bids, where the first bids are priced at their respective fixed prices and the second bids are priced at respective amounts that maintain each second bid in a position marginally above a next-highest bid in the auction (306). For example, the content management system 104 conducts an auction where the first price bids are priced according to the fixed prices specified by their corresponding advertisers, and the second price bids are priced based on the prices of other bids (including one or both of first price bids and second price bids) in the auction.

After one of the first bids is determined to be a winning bid for the auction (308), a correction factor is determined that represents a difference between a fixed price associated with the winning first bid and a second price for the winning first bid (310). For example, after conducting the auction, the content management system 104 may determine that a first price bid is the highest ranked bid in the auction. Even though a first price bid may win an auction, it is possible for a first price bidder to pay more as a first price bidder than he would have paid had the bid been a second price bid. Thus, determining the correction factor can include determining a second price for the first price bid, even though the second price is not used directly for determining the price of the bid in the actual auction. Using this "mock" second price, a difference between the first price (e.g., the "fixed" price associated with the first price bid) and the mock second price can be determined. For example, if bid X is a winning first bid with a fixed price of $1.00, the content management system 104 could calculate a mock second price for bid X with a value of $0.50. Thus, in this example, the correction factor would be the difference between the first price and the mock second price, or $0.50 ($1.00−$0.50).

The correction factor is stored (312). Using the example above regarding bid X, the content management system 104 could store a correction factor of $0.50 for bid X. Storing the correction factor can include accumulating correction factors across multiple auctions to maintain an aggregate correction factor. Correction factors (and aggregate correction factors) can be stored in an account associated with one or more content providers.

In some examples, when the aggregate correction factor reaches a predetermined threshold value further action can be taken. For example, after the aggregate correction factor reaches a threshold value, the content management system 104 could allow the bidder associated with the aggregate correction factor to have a bid augmented or enhanced (causing the bidder to move up a position in a subsequent auction). In some implementations, the content management system 104 adjusts the value of a subsequent first price bid in order to position the first price bid in a winning position in the subsequent auction.

As a result of these techniques, the second prices in future auctions could be calculated relative to the adjusted value of the first price bid, and a loss in auction value equal or proportional to the adjusted amount could be deducted from the aggregate correction factor. For example, if the bidder has accumulated $3.00 as an aggregate correction factor as a result of setting a first price greater than a mock second price in several auctions, the $3.00 (or a portion thereof) could be applied to that bidder's bids in future auctions, which may have the result of raising second prices for other second price bids in those auctions. Accordingly, lost auction value can be recovered from the aggregate correction factor value which, in some examples, represents money overpaid by a first price bidder.

In some examples, a first price bidder can be compensated as a result of overpaying on a first price bid. For example, the content management system 104 could deduct an amount of money from a first price bidder's future bids based on the aggregate correction factor. For example, if a first price bidder has accumulated an aggregate correction factor of $3.00, this amount could be credited to the first price bidder in a future auction by reducing the price that the first price bidder would normally have to pay by some amount (e.g., $3.00) that is based at least in part on the aggregate correction factor.

Content is served based on one or more winning bids from the auction (314). For example, if the first price bid represents the winning bid in an auction, the content management system 104 could serve one or more advertisements on a web page that are associated with the winning first price bid.

Figure 4:
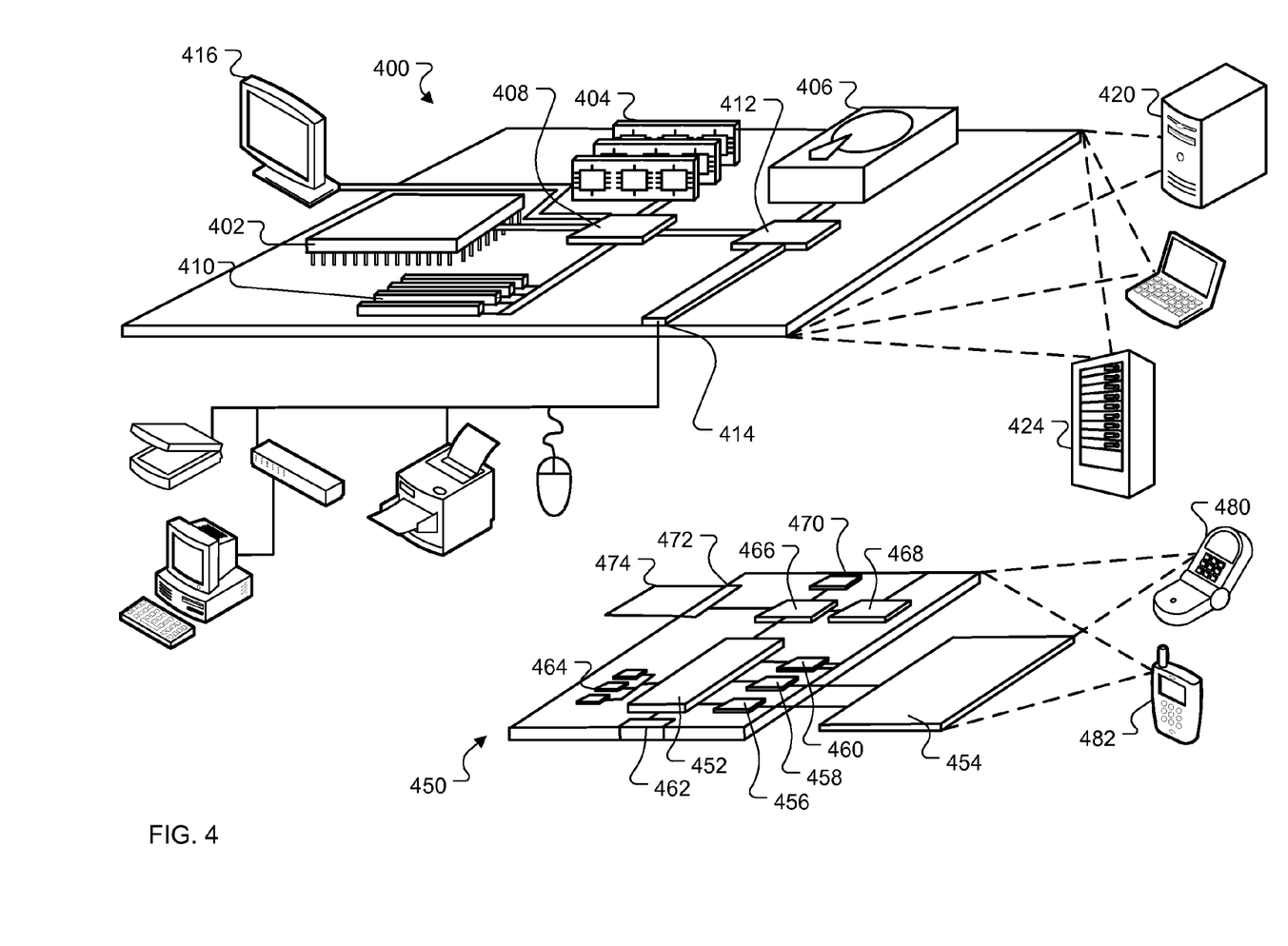
FIG. 4 is a diagram of an example computing system.

FIG. 4 shows an example of a computing device 400 and a mobile computing device 450 that can be used to implement the techniques described in this disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-packable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method of selecting content in an online electronic auction via a computer network, comprising:
   receiving, by one or more processors, a fixed bid associated with a fixed price;
   receiving, by the one or more processors, one or more dynamic bids specifying a price that is adjusted during an auction based on competing bids in the auction;
   conducting, by the one or more processors, a first electronic auction with the fixed bid and the one or more dynamic bids;
   adjusting, by the one or more processors during the first electronic auction, a dynamic price of the one or more dynamic bids;
   determining, by the one or more processors based on the adjustment, that the fixed bid ranks highest in the first electronic auction;
   determining, by the one or more processors responsive to the fixed bid ranking highest in the first electronic auction, a correction factor based on a difference between the fixed price of the fixed bid and the adjusted dynamic price of a dynamic bid of the one or more dynamic bids;
   storing, by the one or more processors in memory, an aggregate correction factor the aggregate correction factor including at least the correction factor;
   conducting, by the one or more processors, a second electronic auction including a second fixed bid associated with a second fixed price, the fixed bid and the second fixed bid having a same bidder;
   retrieving, by the one or more processors from the memory, the aggregate correction factor;
   determining, by the one or more processors, that the aggregate correction factor exceeds a predetermined threshold value;
   applying, by the one or more processors, the aggregate correction factor that exceeds the predetermined threshold value to the second fixed price;
   determining, by the one or more processors based on the application of the correction factor, that the second fixed bid ranks highest in the second electronic auction; and
   providing, by the one or more processors via the computer network, responsive to the determination that the second fixed bid ranks highest with the aggregate correction factor, content associated with the second fixed bid for display on a display device.

2. The method of claim 1, wherein the fixed bid comprises one or more of cost-per-click (CPC) bids and cost-per-thousand impressions (CPM) bids.

3. The method of claim 1, wherein the one or more dynamic bids comprise one or more of cost-per-click (CPC) bids and cost-per-thousand impressions (CPM) bids.

4. The method of claim 1, wherein the one or more dynamic bids comprise one or more of maximum cost-per-click (CPC) bids, maximum cost-per-thousand impressions bids, cost-per-acquisition bids, and cost-per-purchase bids.

5. The method of claim 1, wherein the first electronic auction comprises a second price auction.

6. The method of claim 5, further comprising pricing the one or more dynamic bids in accordance with rules associated with the second price auction.

7. The method of claim 1, wherein the content comprises one or more advertisements.

8. The method of claim 1, further comprising adjusting a future bid of a first bidder associated with the highest ranking fixed bid based at least in part on the aggregate correction factor.

9. The method of claim 8, wherein adjusting the future bid comprises increasing the future bid to a higher amount without charging the first bidder the higher amount.

10. The method of claim 8, wherein adjusting the future bid includes reducing an amount charged to the first bidder for a winning future bid based on the aggregate correction factor.

11. The method of claim 8, wherein adjusting the future bid includes decrementing the aggregate correction factor from an accumulation account associated with the first bidder.

12. A computer storage device comprising instructions that, when executed by one or more processing devices, cause the one or more processing devices to:
   receive a fixed bid associated with a fixed price;
   receive one or more dynamic bids specifying a price that is adjusted during an auction based on competing bids in the auction;
   conduct a first electronic auction with the fixed bid and the one or more dynamic bids;
   adjust a dynamic price of the one or more dynamic bids in the first electronic auction;
   determine, based on the adjustment, that the fixed bid ranks highest in the first electronic auction;
   determine, responsive to the fixed bid ranking highest in the first electronic auction, a correction factor based on a difference between the fixed price of the fixed bid and the adjusted dynamic price of a dynamic bid of the one or more dynamic bids;
   store, in memory, the aggregate correction factor, the aggregate correction factor including at least the correction factor;
   conduct a second electronic auction including a second fixed bid associated with a second fixed price, the fixed bid and the second fixed bid having a same bidder;
   retrieve, from the memory, the aggregate correction factor;
   determine that the aggregate correction factor exceeds a predetermined threshold value;
   apply the aggregate correction factor that exceeds the predetermined threshold value to the second fixed price;
   determine, based on the application of the correction factor, that the second fixed bid ranks highest in the second electronic auction; and
   provide, via a computer network, responsive to the determination that the second fixed bid ranks highest with the aggregate correction factor, content associated with the second fixed bid for display on a display device.

13. The computer storage device of claim 12, wherein the fixed bid comprises one or more of cost-per-click (CPC) bids and cost-per-thousand impressions (CPM) bids.

14. The computer storage device of claim 13, wherein the instructions further comprise instructions to:
   increase the future bid to a higher amount without charging the first bidder the higher amount.

15. The computer storage device of claim 13, wherein the instructions further comprise instructions to:
  reduce an amount charged to the first bidder for a winning future bid based on the aggregate correction factor.

16. The computer storage device of claim 13, wherein the instructions further comprise instructions to:
  decrement the aggregate correction factor from an accumulation account associated with the first bidder.

17. The computer storage device of claim 12, wherein the first electronic auction comprises a second price auction.

18. The computer storage device of claim 17, wherein the instructions further comprise instructions to:
  price the one or more dynamic bids in accordance with rules associated with the second price auction.

19. The computer storage device of claim 12, wherein the content comprises one or more advertisements.

20. The computer storage device of claim 12, wherein the instructions further comprise instructions to:
  adjust a future bid of a first bidder associated with the highest ranking fixed bid based at least in part on the aggregate correction factor.

\* \* \* \* \*